(12) United States Patent
Faenger

(10) Patent No.: US 8,688,320 B2
(45) Date of Patent: Apr. 1, 2014

(54) VEHICLE INFORMATION SYSTEM WITH CUSTOMIZABLE USER INTERFACE

(75) Inventor: Jens Faenger, Santa Clara, CA (US)

(73) Assignee: Robert Bosch GmbH, Stuttgart (DE)

( * ) Notice: Subject to any disclaimer, the term of this patent is extended or adjusted under 35 U.S.C. 154(b) by 226 days.

(21) Appl. No.: 13/004,800

(22) Filed: Jan. 11, 2011

(65) Prior Publication Data

US 2012/0179325 A1    Jul. 12, 2012

(51) Int. Cl.
*G06F 7/00* (2006.01)
(52) U.S. Cl.
USPC ........................................... 701/36; 340/500
(58) Field of Classification Search
USPC ............ 701/31.4, 537, 36; 340/500, 901, 905
See application file for complete search history.

(56) References Cited

U.S. PATENT DOCUMENTS

| | | | |
|---|---|---|---|
| 6,526,335 | B1 | 2/2003 | Treyz et al. |
| 6,668,221 | B2 | 12/2003 | Harter, Jr. et al. |
| 6,828,924 | B2 | 12/2004 | Gustavsson et al. |
| 6,987,964 | B2 | 1/2006 | Obradovich et al. |
| 7,051,160 | B2 | 5/2006 | Beckert et al. |
| 7,159,174 | B2 | 1/2007 | Johnson et al. |
| 2004/0021555 | A1* | 2/2004 | Faris ............................ 340/7.52 |
| 2008/0140281 | A1* | 6/2008 | Morris et al. .................... 701/33 |
| 2011/0066314 | A1* | 3/2011 | Odinak et al. ................... 701/29 |
| 2012/0095643 | A1* | 4/2012 | Bose et al. ................... 701/32.8 |

FOREIGN PATENT DOCUMENTS

WO    0233529 A2    4/2002

OTHER PUBLICATIONS

Li et al., "Group Device Pairing based Secure Sensor Association and Key Management for Body Area Networks," Department of ECE, Worcester Polytechnic Institute, Worcester, MA (9 pages).
Invitation to Pay Additional Fees and, Where Applicable, Protest Fee in corresponding PCT application (i.e., PCT/US2012/020798), mailed Jul. 11, 2012 (6 pages).
"Ford Sync Connects Car With Internet: New WIFI Receiver, Built-in Web Browser, Mobile Hotspot," Availabe at http://media.ford.com/content/fordmedia/fna/us/en/news/2010/01/07/ford-sync-connects-car-with-internet--new-wifi-receiver--built-i.html Jan. 2, 2010 (2 pages).

* cited by examiner

*Primary Examiner* — Thomas Tarcza
*Assistant Examiner* — Kevin Myhre
(74) *Attorney, Agent, or Firm* — Maginot, Moore & Beck

(57) ABSTRACT

In accordance with one embodiment, an information system located within a vehicle includes a data storage device configured to store programmed instructions to implement a web browser, a data communication module, and a controller operatively coupled to the data storage device, and the data communication module, the controller configured to execute the web browser to receive a plurality of data elements, identify a respective content type for each of the plurality of data elements, assign a relevance level to each of the plurality of data elements based on the respective identified content type, compare the assigned relevance to a predetermined relevance threshold; and generate a user interface using at least one of the plurality of data elements based upon the comparison.

14 Claims, 5 Drawing Sheets

VEHICLE INFORMATION SYSTEM WITH CUSTOMIZABLE USER INTERFACE

TECHNICAL FIELD

This application relates generally to information and entertainment systems used in vehicles, and more particularly to vehicular information systems that use a web application framework.

BACKGROUND

Information and entertainment systems incorporated into vehicles are well known in the art. Information systems include components that provide information about the operating condition of the vehicle. Common examples of information systems include dashboards in motorized ground vehicles, instrument panels in aircraft, and various gauges and instruments in boats and other sea craft. In many embodiments, the information system provides information from various sensors and gauges, including, but not limited to, speed, tachometer readings, fuel levels, engine temperature readings, oil pressure readings, electrical system voltage levels, and the like. More recently developed information devices include in-vehicle navigation systems that use the global positioning system (GPS) to provide a vehicle operator with navigational aids, and cameras that display video of areas around the vehicle that are otherwise obscured from the view of the operator.

In addition to information systems, many vehicles also include entertainment systems. Common examples of in-vehicle entertainment systems include radios, cassette and compact disc (CD) players, digital music players, and video playback devices. The entertainment systems may have various operating modes, with some devices like radios and audio devices being operational when the vehicle is in operation, while video playback devices may operate only when the vehicle is not in operation to prevent distracting the operator.

An "infotainment system" refers to a category of information system that combines both information and entertainment systems in a vehicle. An infotainment system may include various discrete components that are installed in a vehicle, but are otherwise disconnected from one another, such as a speedometer and a radio in a conventional automobile. More recently, advances in computing and display technology have enabled so-called "glass cockpit" systems that may display a combined view of data from multiple sources on an electronic display device. The term "glass cockpit" originated in the field of aviation, but similar devices have spread to many vehicles including ground and water vehicles. Integrated infotainment systems may provide at least some vehicle information and entertainment information using a common user interface. Examples include dashboard display panels that display a digital map for navigation in one mode, while displaying music information in another mode. Audio devices including speakers in a vehicle may play music and audible alerts to the operator from various information systems.

Infotainment systems may send and receive data using various digital networks including the Internet using one or more wireless network connection technologies including the IEEE 802.11 family of protocols and various wide-area networks using 3G and 4G technologies. The network connectivity enables communication between the vehicle and various computing systems on the Internet in general, and with the World Wide Web (WWW) in particular. Additionally, these systems may communicate directly with an electronic device placed in the vehicle using a wired communication port or a wireless communication channel.

Known vehicular information and infotainment systems have many features, but also present many design and user interface challenges. Many variations in hardware and software components exist between different types of vehicles, and even between different models of a single vehicle such as different option packages for a single car model. Consequently, information systems for different vehicles vary widely, with little standardization or compatibility between systems. Additionally, different information systems present information in widely different formats that increase the time needed for a vehicle operator to become accustomed to the information system.

What is needed is an information system that provides information and entertainment to operators of a plurality of vehicles having different components and operating configurations. What is further needed is an information system that provides a common user interface to a vehicle operator in different vehicles.

SUMMARY

In accordance with one embodiment, an information system located within a vehicle includes a data storage device configured to store programmed instructions to implement a web browser, a data communication module, and a controller operatively coupled to the data storage device, and the data communication module, the controller configured to execute the web browser to receive a plurality of data elements, identify a respective content type for each of the plurality of data elements, assign a relevance level to each of the plurality of data elements based on the respective identified content type, compare the assigned relevance to a predetermined relevance threshold; and generate a user interface using at least one of the plurality of data elements based upon the comparison.

In a further embodiment, an information system located within a vehicle includes a data storage device configured to store programmed instructions to implement a web browser, at least one vehicle sensor configured to generate a signal corresponding to at least one operating condition of the vehicle, a data communication module, and a controller operatively coupled to the data storage device, the at least one vehicle sensor, and the data communication module. The controller is configured to implement a web browser, implement a software module configured to receive data generated by the at least one vehicle sensor in a first format, identify the at least one vehicle sensor based on the data received in the first format, and to generate a data record corresponding to the vehicle sensor data in a second format, receive data corresponding to a web application using the data communication module, operate the web browser to execute the web application, and provide the data record corresponding to the vehicle sensor data in the second format to the web application.

DETAILED DESCRIPTION

Figure 1:
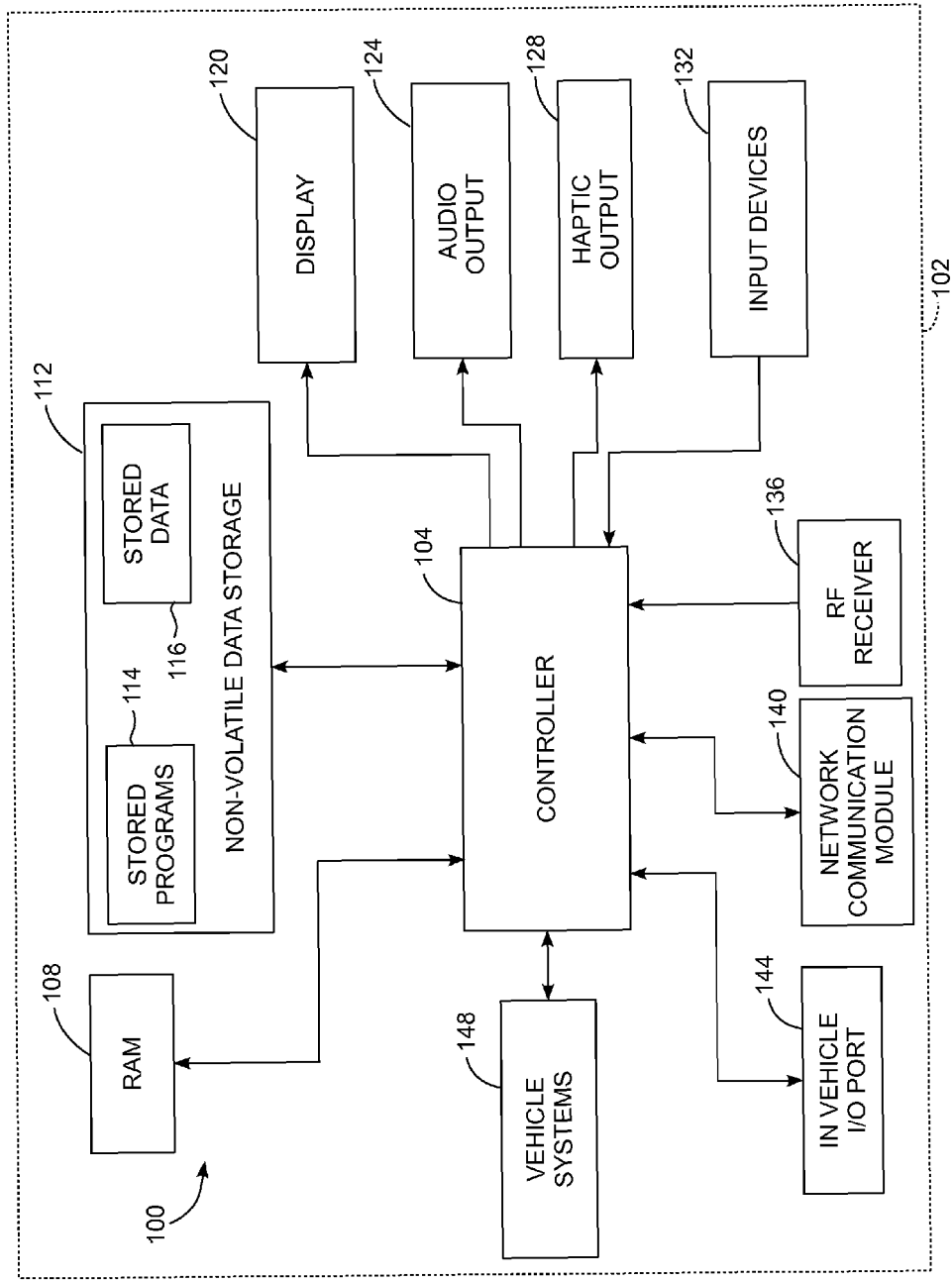
FIG. 1 is a schematic view of a control system that is configured to implement an information system in a vehicle.

For a general understanding of the details for the systems and processes disclosed herein, the drawings are referenced throughout this document. In the drawings, like reference numerals designate like elements. The term "vehicle" as used herein refers to any motorized vehicle including, but not limited to, cars, trucks, sport utility vehicles (SUVs), motor-cycles, mopeds, aircraft, boats, personal watercraft, and the like. This includes vehicles that operate using various drive systems including, but not limited to, internal combustion engines, electric motors, hybrid drive train systems, jet engines, turbines, and the like.

The term "user interface" refers to the components and processes used by an in-vehicle information system to present information to one or more occupants or users in the vehicle. The user interface also enables users to control the information system. User interfaces may present information to users in various formats, including graphics, text, audible messages, and haptic feedback. The user may control the user interface using multiple techniques including mechanical controls, voice controls, touch-screen interfaces, and the like.

As used herein, the terms "web app" and "web application" are interchangeable and refer to a client-server arrangement where a client, typically a web browser or other application configured to use the Hyper Text Transfer Protocol (HTTP), requests data from a server, typically a web server. Unlike a traditional web client-server configuration where a client requests data only for presentation, the web app client includes a code execution engine, typically embodied as a JavaScript interpreter, that enables the client to execute a downloaded program on the same computing device hosting the client software.

In a typical embodiment, a web app client downloads executable code, also referred to as the application, from a web server along with data corresponding to the application. In common web applications, the executable code consists of one or more scripts written in a scripting language such as JavaScript, although any code that may be executed within the web browser or a web browser plugin such as the Flash or Java plugins may execute code as well. The data corresponding to the application may include text formatted data including the Hyper Text Markup Language (HTML) and Extensible Markup Language (XML) formats, or may be in binary coded format including image, video, and audio data. A single web browser may execute one or more web apps in conjunction with one or more servers, and some existing web apps also present data retrieved from multiple, unrelated web servers.

During operation, the web app client may generate a user interface and take actions in response to user input. In some web app embodiments, the web app client requests data from the server during execution. The web app may make requests asynchronously while continuing to display a user interface using methods such as the Asynchronous JavaScript and XML (AJAX) method. When data are received in an XML format, the Extensible Style Sheet Language (XSLT) may be used to generate a document in HTML format using structured XML data as an input.

The web app client may alter the layout and presentation of data using one or more presentation transformation tools including Cascading Style Sheets (CSS). A cascading style sheet is a set of configuration data that specifies one or more rules that define how the web app client should present information. Each rule receives a precedence weighting, and in instances where multiple rules conflict, the web app follows the rule with the highest precedence. The CSS standards enable the web client to selectively display data and to alter the color, size fonts, and positions of displayed data. The CSS standards include non-visual presentations of data and enable a web client to convert received data to synthesized speech and to haptic feedback.

FIG. 1 depicts a schematic diagram of a vehicle information system 100 located in a vehicle 102. The information system 100 includes a controller 104, random access memory (RAM) 108, non-volatile data storage device 112, display 120, audio output 124, haptic output 128, input devices 132, radio frequency (RF) receiver 136, network communication module 140, in vehicle input/output (I/O) port 144, and one or more vehicle systems 148. The controller 104 is an electronic processing device such as a microcontroller, application specific integrated circuit (ASIC), field programmable gate array (FPGA), microprocessor including microprocessors from the x86 and ARM families, or any electronic device configured to perform the functions disclosed herein. Controller 104 may implement software and hardware functional units including a graphical processing unit (GPU) for generation of visual display data, as well as an audio digital signal processor (DSP) for generation of audible output signals. Controller 104 is configured to execute instructions corresponding to one or more software programs. While FIG. 1 depicts vehicle information system 100 using a single controller 104, various information systems may use one or more controllers. Some or all of the functions provided by the data storage device 112, RAM 108, RF receiver 136, network communication module 140, in-vehicle I/O port 144, and vehicle systems 148 may be integrated with the controller 104 using either hardware or software in a system on a chip (SoC) configuration.

RAM 108 may be embodied by any memory device that enables controller 104 to load and store data from the memory device in a random access. Example embodiments include dynamic RAM (DRAM) and static RAM (SRAM). RAM 108 is operatively coupled to the controller 104 and controller 104 may load and store program instructions and data in the RAM 108. In a typical embodiment, RAM 108 is volatile, meaning that contents of the RAM 108 are erased in the absence of electric power.

Non-volatile data storage device 112 may be implemented as a hard drive, solid state drive, or as any digital storage device that is configured to retain data in the absence of externally supplied electrical power. Data storage device 112 is operatively coupled the controller 104. Data storage device reads stored data and provides the data to the controller 104, and writes data in response to a write command from the controller 104. The data storage device 112 is configured to hold one or more stored programs 114 and stored data 116. Stored programs 114 include executable code to implement an operating system and one or more user space programs that execute within the operating system. Exemplary user space programs include web browsers and web servers.

Stored data 116 include various data files for use by one or more stored programs in operation. The stored data 116 contain one or more sets of configuration data that define the format of user interfaces for the programs in the stored program data 114. The configuration data may include CSS and XSLT files that define rules for generating a user interface. One embodiment of data storage device 112 includes multiple data storage devices where one data storage device is fixedly installed in the vehicle 102 and holds the program data 114, while a second data storage device holding data is configured to be connected to and removed from the vehicle 102.

Display 120 includes at least one visual display device, such as a liquid crystal display (LCD), organic light-emitting diode (OLED) display, or projection device. Different vehicle configurations may include one or more display devices at various locations in the vehicle 102, including heads-up displays that project an image in front of the operator when operating the vehicle 102. The controller 104 is operatively coupled to the display device 120 and generates signals corresponding to text and graphics for display on or by the display device 120. The display device 120 converts the generated signals into visual output.

Audio output 124 typically includes one or more audio speakers that are operatively coupled to the controller 104. The audio output 124 may include various filters and amplifiers for processing of audio signals prior to output. The controller 104 generates one or more audio signals for the audio output 124, including audio and music received from the RF receiver 136 or held in stored data 116. Audio output 124 also emits sounds corresponding to synthetic speech signals that the controller 104 generates during operation.

Haptic output 128 includes one or more tactile feedback devices positioned in the vehicle 102 and operatively coupled to the controller 104. The haptic output 128 generates a feedback force that provides feedback to the operator of the vehicle 102. Common examples of haptic feedback devices include servos and actuators that are operatively coupled to the steering wheel, accelerator pedal, and brake pedal in an automobile. Various haptic devices may be placed on different control devices in different vehicles, including in the yoke of an aircraft and handlebars of a motorcycle. Various types of feedback force include vibration or a hysteresis force that resists movement applied by the operator.

Input devices 132 are configured to generate signals in response to a user action, and to provide the generated signals to the controller 104. Various types of input device 132 include, but are not limited to, buttons, knobs, dials, switches, sliders, keypads, touch-screen devices, and audio input devices. In particular, the display device 120 may include a touch screen interface that enables an operator to touch one or more sections of the display 120 to input commands. Audio output 124 may be coupled with an input device 132 in the form of a microphone that routes audible commands to the controller 104, and the controller 104 may implement a voice recognition system to identify the spoken commands. The controller 104 is configured to take one or more actions in response to receiving generated signals from the input devices 132. The controller 104 may take different actions for a signal generated by the same input device in response to the operating state of the information system 100 at the time the signal is generated. For example, a dial may be used to adjust the volume level of music when the controller 104 presents a music application to the operator, while the same dial may be used to adjust a temperature level for a climate control system in a different operating context.

RF receiver 136 is configured to receive radio frequency emissions using various modulation techniques on different frequencies. Common examples include analog AM and FM radio, terrestrial digital radio, satellite radio, as well as terrestrial and satellite video transmissions. The controller 104 may be configured to decode data received from the RF receiver 136 and to generate corresponding video and audio signals for the display 120 and audio output 124, respectively. In an alternative configuration, the RF receiver may generate signals for the display 120 and audio output 124 directly, and may provide metadata to the controller 104. Various forms of metadata include audio and video titles, artist information, play lengths, audio video bit rates, and other information that may be provided to the operator through display 120 and audio output 124.

Network communication module 140 is operatively coupled to the controller 104 and enables the controller 104 to send and receive data using one or more digital networks. In a typical embodiment, network communication module 140 implements a wireless networking protocol that enables the controller 104 to send and receive data using external data networks while the vehicle 102 is in operation. Examples of suitable wireless networks include 3G and 4G cellular data networks, satellite based communication networks, any suitable wireless wide area networks (WWANs), wireless local area networks (WLANs) including IEEE 802.11 wireless networks, and any wireless data transmission standard appropriate for use with the vehicle 102. Controller 104 may be configured to send and receive data packets using an Internet Protocol (IP) based protocol using, for example, either IP version 4 or IP version 6, common connection layer protocols including the Transport Control Protocol (TCP) and User Datagram Protocol (UDP), and a plurality of application level protocols. In particular, the controller 104 embodied in FIG. 1 is configured to send and receive data conforming to the Hyper Text Transport Protocol (HTTP) commonly used with the World Wide Web.

An input/output (I/O) port 144 is positioned within the vehicle and enables the controller 104 to send and receive data with one or more electronic devices that are in proximity to the vehicle. The I/O port 144 may be implemented as a wired connection using a standard connection type such as the Universal Serial Bus (USB) or various other wired connection standards. The I/O port 144 may also be a wireless port that enables communication with an electronic device through a wireless protocol including the 802.11 WLAN and Bluetooth protocols. The I/O port 144 and network communication module 140 may share common hardware components in some embodiments.

Various electronic devices may communicate with the controller 104 using the I/O port 144, including diagnostic equipment and electronic devices carried by the operator or occupant of the vehicle. In one embodiment, an occupant carries a handheld communication device such as a smart phone that includes communication hardware and software for communicating with the controller 104 using the I/O port 144. As described in more detail below, the information system 100 may run web applications and retrieve configuration data provided by the electronic device.

One or more vehicle systems 148 are operatively coupled to the controller 104. The vehicle systems may include one or more sensors and gauges in the vehicle. Common examples in an automobile include the speedometer, tachometer, fuel gauge, engine temperature gauge, tire pressure gauges, and the like. Controller 104 may also be configured to obtain error codes and diagnostic messages from an onboard diagnostic computer system, and in some embodiments the controller 104 may implement the function of the onboard diagnostic system. The controller 104 may identify trouble codes corresponding to an On-Board Diagnostics (OBD) protocol, and generate a plain-language visual or audio message corresponding to the trouble code. Other in-vehicle systems may include components having motors for automatic adjustment including an adjustable steering column, seats, gas and brake pedals, and mirrors. The controller 104 may be operatively coupled to the vehicle systems 148 using a Controller-area Network (CAN) communication bus, or other communication systems suitable for sending commands to vehicle components and for receiving data from different systems in the vehicle.

In operation, controller 104 obtains program data 114 from the data storage device and executes the program data. The program data 114 include a web browser program that enables the controller 104 to send and receive data with one or more web servers using one or both of the network communication module 140 and the in vehicle I/O port 144. The web browser is configured to download data corresponding to various web applications and execute the web applications on the controller 104. Program data 114 also include one or more software modules that the controller 104 executes to provide access to one or more of the vehicle systems 148 using the web browser. The following figures describe processes that are suitable for use with the embodiment of FIG. 1 for illustrative purposes, but various alternative embodiments of the vehicle information system 100 may be used as well.

Figure 2:
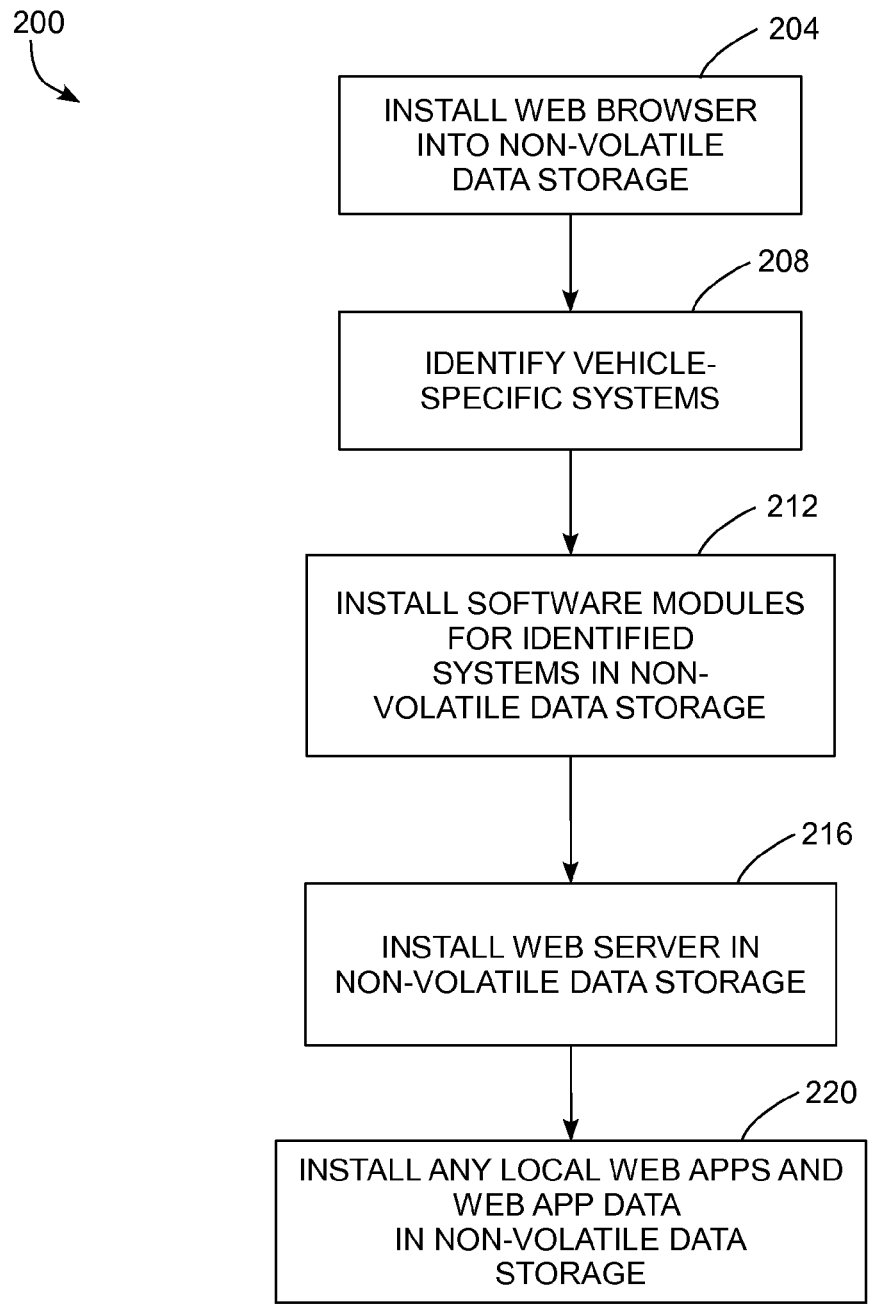
FIG. 2 is a block diagram of a process for configuring a controller in a vehicle with a web browser and software modules that enable the web browser to access one or more systems in the vehicle.

FIG. 2 depicts a process 200 for installing and configuring a web browser in vehicle information system 100. Process 200 begins by installing the web browser into a non-volatile data storage device 112 in the vehicle 102 (block 204). The web browser may be installed during manufacture of the vehicle, or may be loaded into stored programs 114 portion of the data storage device 112 of an existing control system such as control system 100. Various versions of the web browser may be compiled for different vehicle controller architectures, with the different versions of the web browser implementing the same functions for multiple controllers. In particular, each version of the web browser implements a scripting engine for execution of one or more scripting languages such as JavaScript, and a document presentation engine configured to use HTML, XML, XSLT, and CSS to present a user interface in the vehicle.

As described above, the controller 104 is operatively coupled to one or more vehicular systems. Process 200 identifies the vehicle systems 148 present in a particular vehicle 102 (block 208). In one embodiment, a manual process identifies vehicle systems 148 with respect to the make, model, and production year of the vehicle 102. Alternatively, a profiling program may generate query messages and record responses from one or more vehicle systems 148. In vehicles employing a CAN interface, one or more Parameter Identifier (PID) queries may be sent through the CAN to one or more systems 148 in the vehicle 102. Each system generates a response to a corresponding PID query, and the profiling program may identify the system in accordance with predetermined PID response codes.

At block 212, one or more software modules that enable the web browser to interact with the identified vehicle systems 148 are installed as stored programs 114 in data storage device 112 (block 212). The software modules translate data sent and received from the vehicular systems into a format that is compatible with the web browser. The software modules corresponding to different vehicle systems enable a web applications running in the web browser to access multiple types of vehicle systems 148 even when the vehicle systems 148 have different hardware implementations that perform similar functions. In some embodiments, a software module identifies data sent from one or more vehicle systems 148, and generates data formatted for the web browser from each of the identified systems.

An exemplary software module is configured to provide compatible fuel level data to the web browser for a fuel level sensor that is operatively coupled to the vehicle information system 100 using the CAN data connection standard. The fuel level sensor generates data using one or more data frames conforming to at least one of the CAN base frame and CAN extended frame formats. A software module parses the CAN data frame and identifies the type of data as a fuel level. The software module extracts the data corresponding to the measured fuel level generated by the fuel level sensor. The software module then converts the data in the CAN frames into a format that is compatible with the web browser, such as an XML or JSON (Javascript Object Notation) data format, using a predetermined document structure that is compatible with various web applications. Vehicles having different fuel sensor hardware configurations may each have a compatible software module that generates XML data for the web browser from the data generated by each fuel sensor.

The software modules may be implemented as a web service executed by the controller 104 and accessed using the HTTP protocol, or may be implemented as one or more dynamically loaded modules that extend the functionality of the web browser. The functions of the software modules may be exposed to web applications using a predetermined Application Programming Interface (API). Thus, the system specific software modules enable the web browser to provide a uniform interface to vehicle systems for web applications, even when different vehicle models use different hardware systems. In one embodiment, the software modules are installed during manufacture of the vehicle. In the embodiment of FIG. 1, controller 104 may download the identified software modules using network communication module 140 or I/O port 144 and store the software modules with the stored programs 114 in the data storage device 112. The download process may also retrieve updated versions of one or more software modules after the initial installation is completed.

The embodiment of information system 100 provides one or more local web applications where the executable code and associated data for the application are stored in a data storage device 112 located within the vehicle 102. Controller 104 may execute the local web applications during periods when the vehicle 102 is unable to communicate with external data networks. In some embodiments, the controller 104 obtains local web application data stored in the data storage device 112 more quickly than obtaining data using an external data network, and thus enables faster responses to user requests, even when external data networks are available. To enable local web applications, a local web server program is installed in non-volatile data storage device 112 in the vehicle 102 (block 216). The executable code for the local web application and corresponding data are also stored in the data storage device 112 (block 220). In operation, the controller 104 executes both the web browser and web server programs, although two different controllers may execute the browser and server software in an alternative vehicle information system embodiment. Instead of relying on a local web server, the browser can also load the local web application directly from the storage such as by using the file://Protocol.

Due to the wide variety of vehicle computing systems, sensors, and data communication protocols used in different vehicles, each type of vehicle may receive a different combination of web browser and software modules. The web browser and associated software modules that interface with vehicle systems enable compatibility between a plurality of vehicle types with one or more web applications. The web browsers in various types of vehicles may execute a single web application to perform a particular task instead of requiring specific software applications written for each vehicle. The software modules loaded into each vehicle provide compatibility between systems having similar functions, but different hardware configurations. Using the fuel gauge example described above, a single web application tracks the rate of fuel consumption in a vehicle and provides a visual representation of the fuel levels and usage to the vehicle operator. The fuel consumption web application may be used with various vehicles including a boat, truck, passenger car, and motorcycle even though these vehicles each employ different embodiments of control systems and fuel sensors.

The process 200 shown in FIG. 2 is illustrative of one embodiment of a process for configuring a vehicle information system. Thus, alternative embodiments may omit some of the process operations described above, and the process 200 may be carried out in an order other than the order of FIG. 2. While process 200 is described with reference to the vehicle information system 100 of FIG. 1, process 200 may be used with alternative vehicle information system embodiments.

Figure 3:
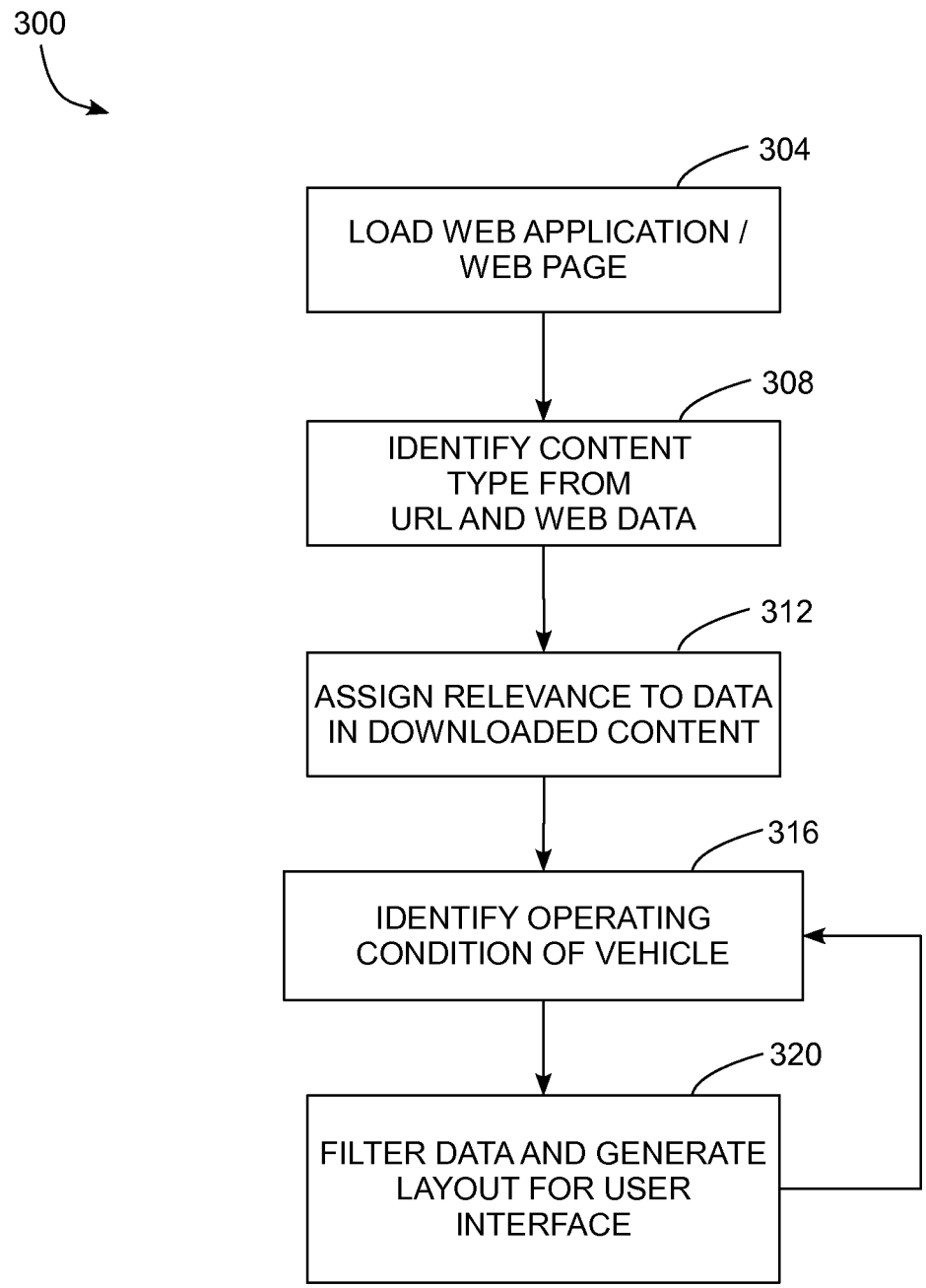
FIG. 3 is a block diagram of a process for selecting and presenting data through the user interface of an information system in a vehicle.
Figure 4A:
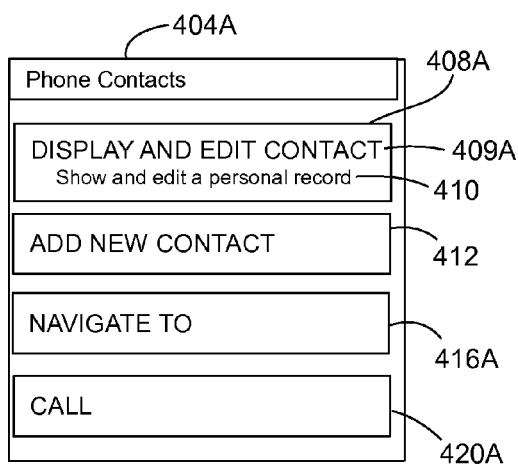
FIG. 4A is an exemplary user interface screen in a vehicle information system when the vehicle is in a first operating condition.
Figure 4B:
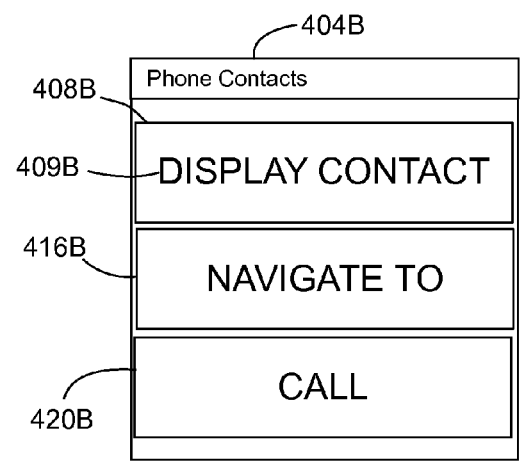
FIG. 4B is a modified version of the screen in FIG. 4A generated by the vehicle information system when the vehicle is in a second operating condition.

FIG. 3 depicts a process 300 for presenting data elements in a web application or web page using a web browser in an information system 100, and FIG. 4A and FIG. 4B depict two exemplary user interface displays having different layouts generated using process 300. In process 300, controller 104 executes a web browser in the vehicular information system 100 to load data including a web application or web page (block 304). Each web application or web page contains one or more data elements. The term data element refers to an item of text, graphics, video, audio, user interface controls, and any other data for presentation via the user interface. In web applications using data structured in markup language such as HTML or XML, each markup element may identify a data element, and a data element may also include one or more nested markup elements. The web application may be an interactive application with a user interface, or may be a web page including a combination of text, graphics, video, and audio data. The web application may receive content from one or more remote servers using a data network, including web servers that may be present in portable electronic devices within the vehicle 102. Portable electronic devices such as portable digital media players and smart phones that operatively connect to the I/O port 144 may provide a predefined set of services and applications, such as streaming music and video from the electronic device to the web browser. The portable electronic devices may also provide other information including address book and navigation information to the vehicle information system 100.

Process 300 identifies the type of content present in the web application or web page (block 308). The "content type" refers to the information intended to be perceived by a user when the data element content is presented to the user. Various methods of identification include analysis of metadata and semantic data associated received by the web application. Metadata include markup elements and tags present in data that the web browser receives that are not intended for direct display as part of the document, but instead provide information that the web browser may use to identify the content and purpose of the data. Semantic data may be associated with a single data element, or with a plurality of data elements associated with a web page. The web browser may also identify the data when the data use semantic descriptors including the Resource Description Format (RDF), Web Ontology Language (OWL), and microformats that enable machine identification of web content.

In another embodiment, the web browser uses the uniform resource locator (URL) associated with a web page as an index into a knowledge base of predetermined URLs and identifies the type of content associated with the URL. The knowledge base may be stored with stored data 116 in data storage device 112 in the vehicle 102, or may be placed on a web server that is accessible to the web browser. For example, a URL containing "youtube.com" may have a knowledge base entry that indicates the content of the loaded data includes a video.

In still another embodiment, process 300 identifies the type of web content by a direct analysis of content received by the web browser. In this embodiment, the web browser or other software in the vehicle information system 100 perform document and text classification using, for example, Bayesian network techniques, word frequency analysis, and key word identification that generate an identification of the content of a web page. Process 300 identifies the type of web application or web data to enable identification of relevant data for presentation to the user.

Once the type of content is identified, process 300 identifies relevant portions of the content for presentation to the user (block 312). As used herein, the terms "relevance" as applied to data elements refers to a ranking of various data elements for presentation via the user interface, based upon the content type identified in block 308. Process 300 may assign a numeric relevance level to a data element or order data elements in a hierarchy according to relevance. For example, in a web application, the user interface elements that enable the user to interact with the web application may be assigned a higher relevance, while in a streaming audio application the selected audio stream receives the highest relevance. Process 300 references identified relevance of data elements in a web application or web page when arranging the data elements in a layout for presentation via the user interface.

When presenting data to the operator of the vehicle 102, the vehicle information system 100 identifies the operating condition of the vehicle (block 316). One exemplary vehicle is an automobile having multiple operating conditions. Three exemplary operating conditions may be when the automobile is parked, when the automobile is moving above a predetermined speed, and when the automobile is stopped in traffic. The vehicle information 100 system may identify the operating condition of the vehicle 102 from one or more vehicle systems 148 including a speedometer, brake sensor, and gear selection.

The vehicle information system 100 filters information and generates the layout of user interface data presented to the user with reference to the identified content type, content relevance, and operating condition of the vehicle 102 (block 320). The layout of data elements refers to position, size, order, color, and any characteristic of the data elements that affects the presentation of the data elements to the user. Layout may refer to non-visual presentation of data as well. For example, a layout may present one data element visually, and present another data element audibly.

Process 300 may generate a user interface using data elements with identified relevance levels that exceed a predetermined relevance threshold. The threshold may be a numeric relevance identifier, or the threshold may represent a predetermined number of the most relevant data elements. The relevance threshold may also be selected in response to the operating condition of the vehicle 102. For example, when the vehicle 102 is in motion, the relevance threshold may be higher than when the vehicle is parked.

In a visual user interface using visual display 120, the web browser may generate a layout of data elements beginning with the data elements having the highest relevance and continuing to display lower relevance data elements until the display is filled with information. Process 300 may generate a layout of the data elements that displays data elements having a higher relevance with larger display sizes and more prominent positions in the layout than lower relevance data elements.

As noted above, process 300 also presents user interface data with respect to the identified operating condition of the vehicle 102. In some instances, the content type conflicts with the operating condition of the vehicle, and the content is filtered from view until the operating condition changes. For example, a web application that presents a graphical interactive game to the operator is filtered from use when the vehicle 102 is in motion or stopped in traffic, but may be available when the vehicle 102 is parked. In one configuration, web pages including text content are not presented using visual display 120 when the vehicle 102 is in operation. The information system 100 may, however, generate synthetic speech corresponding to the text to enable audio playback of the text elements in a web page when the vehicle 102 is in operation. Process 300 may identify the operating condition of the vehicle (block 316) and adjust the layout of data presented via the user interface (block 320) in a continuous manner as the operating conditions of the vehicle 102 change.

One example of the process 300 is described with reference to FIG. 4A and FIG. 4B. In this example, a web application in the form of an address book is received by the vehicle information system 100 at block 304. The vehicle information system 100 implements a web browser to execute the functions of the address book application and to generate a user interface based on the data elements received with the address book application.

At block 308, process 300 identifies the content type of the data elements associated with the web application. The address book application is identified as an interactive web application that provides functions related to personal contacts and addresses to a user in the vehicle 102. The data types of different data elements in the web application are identified in block 308. Examples of such elements may include address book application control elements, address book contact data elements including names, phone numbers, street addresses, and photographs of contacts in the address book, navigational information, and advertising elements associated with the web application.

At block 312, the data elements are assigned relevance levels based on the identified type of the data item. Using the address book example, the highest relevance is assigned to the control elements that enable the user to select different operations within the address book web application. The web application may receive data elements such as graphics and text that process 300 assigns to lower relevance levels. For example, the vehicle information system 100 may assign a low relevance to graphical data elements such as banner graphics that provide decoration in the web application data.

At block 316, the operating condition of the vehicle 102 is identified. The vehicle information system 100 may determine the operating condition of the vehicle based on data received from one or more in vehicle systems 148. One or more vehicle systems including, for example, a global positioning system (GPS), a speedometer, a tachometer, a brake sensor, or a gear indicator that indicate the operating condition of the vehicle 102. Since the operating condition of vehicle 102 may change at one or more times, the vehicle information system 100 may monitor the operating condition of the vehicle 102 to identify changes in the operating condition.

At block 320, the vehicle information system 100 generates a user interface based on the data elements in the address book web application. The user interface has a layout that is generated in accordance with the identified data types of data elements in the web application, relevance assigned to the data elements, and the identified operating condition of the vehicle 102.

FIG. 4A depicts a visual display 404A of a first user interface layout for the example address book web application. The user interface layout of FIG. 4A is generated when the vehicle information system 100 determines that the vehicle is in a parked operating condition.

Visual display 404A includes data elements 408A, 412, 416A, and 420A arranged in a first layout. Entry 408A displays a main text element 409A with a large font and a descriptive text element 410 in a smaller font. Process 300 assigns a lower relevance to descriptive text element 410 than the main text element 409A. Element 408A enables a user to view and edit information pertaining to a contact in the address book. Element 412 is a touch screen button that generates another menu (not shown) that enables the user to enter information corresponding to a new contact in the address book application. Element 416A activates an in-vehicle navigation application that provides directions to a geographic address stored in the address book, and the element 420A activates a voice call application that may place a phone call to a phone number stored in the address book.

When the vehicle information system generates the user interface seen in FIG. 4A, the vehicle 102 may change operating conditions from being parked to being in motion. Process 300 continues to identify the operating condition of the vehicle 102 at block 316. At block 320, process 300 generates a user interface for the address book application in accordance with the identified operating condition as shown in FIG. 4B.

FIG. 4B depicts a visual display 404B of the address book web application having a simplified layout that process 300 generates when the vehicle 102 is in motion. In FIG. 4B, the content of data entry 408B has been altered to only display the text 409B that enables a user to view an address book entry, but not to edit the entry as seen in FIG. 4A. In the instance of FIG. 4B, text element 409B is simplified version of the text element 409A that prompts the user to display a contact, and the explanatory text 410 is from the interface in 404B. The explanatory text 410 has a lower relevance than the title text 409B and the relevance threshold that corresponds to operating condition of the vehicle 102. Thus, explanatory text 410 is omitted from view to reduce distraction when the vehicle is in operation.

In FIG. 4B, process 300 removes the "add new contact" data element 412 from the data display 404B. When identifying the content type of data elements in the address book application at block 308, the process 300 may identify predetermined words such as "edit" and "add" in a date element that are associated with actions related to one or more vehicle operating conditions. In the example of FIG. 4B, data elements including the predetermined words are modified or removed from the user interface when the vehicle 102 is in motion. Thus, data element 412 is omitted from the display 404B, and data element 408B is displayed in a modified layout corresponding to the operating condition of the vehicle 102.

Process 300 generates visual display 404B with the elements 408B, 416B, and 420B depicted with larger sizes and in different positions than shown in FIG. 4A. In particular, the font sizes of the data elements 408B, 416B, and 420B each have larger font sizes from the layout seen in FIG. 4A to make the entries more recognizable when the vehicle 102 is in motion. The data elements 408B, 416B, and 420B are positioned next to one another using the available display space, with no intervening gap corresponding to the omitted element 412.

While some prior art automotive display systems disable selected in-vehicle functions when the automobile is in operation, the prior art systems still display a "grayed out" view of menu entries for disabled functions. The displays shown in FIG. 4A and FIG. 4B, however, change the user interface layout to remove inactive user interface elements and also change the layouts of the remaining user interface elements to provide an alternative user interface layout when the vehicle is in operation.

The process 300 shown in FIG. 3 is illustrative of one embodiment of a process for changing the presentation and layout of a user interface in a vehicle information system. Thus, alternative embodiments may omit some of the process operations described above, and the process 300 may be carried out in an order other than the order of FIG. 3. While process 300 is described with reference to the vehicle information system 100 of FIG. 1, process 300 may be used with alternative vehicle information system embodiments.

Figure 5:
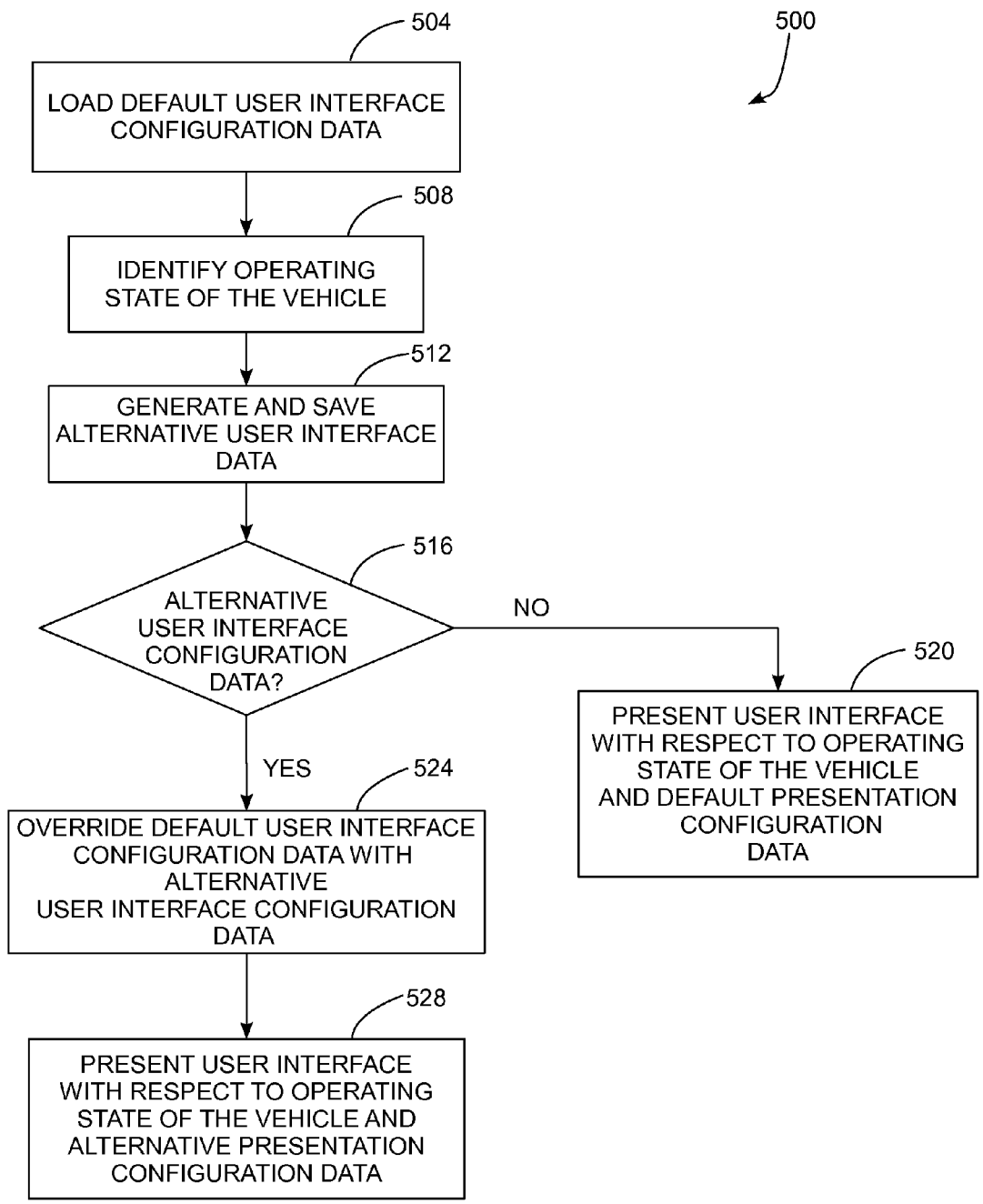
FIG. 5 is a block diagram of a process for operating a vehicle information system using an alternative set of user interface data.

FIG. 5 depicts a process 500 that enables a user to change the user interface configuration of the vehicle information system 100. In process 500, the information system first loads a default set of user interface configuration data (block 504). As described above, a web browser implementing web applications may change the user interface for data presentation using XSLT, CSS, or other data transformation techniques. The default configuration data, therefore, may include one or more files that define user interface formatting. The default user interface configuration data may include rules for synthesizing speech from text and also for generating haptic feedback. Process 500 also identifies the operating condition of the vehicle (block 508) in a manner similar to process block 316. The user information system 100 in vehicle 102 enables user interface configuration changes to be entered via input devices 132 for certain identified operating conditions such as when a vehicle is stationary, and may prevent user interface configuration changes when the vehicle is in operation.

When the vehicle information system identifies that the vehicle is in an operating condition that enables user interface changes, an occupant of the vehicle may change the user interface to suite his or her personal preferences (block 512). Various alterations to a default user interface include, but are not limited to, selecting an interface color scheme, font typeface, font size, volume level for audio output, phone numbers, navigation settings, and various settings for entertainment including preferred radio stations and internet media services. In one embodiment, the user may adjust the user interface using input devices 132 in the vehicle 102, and may select interface options using an external computing device such as a smart phone. Once the user has adjusted the user interface, the preferred configuration may be saved for future use as a set of alternative configuration data.

The alternative configuration data may be saved to a data storage device within the car for future retrieval, may be uploaded to a web server, or may be saved in a portable electronic device such as a personal media player or smart phone. In vehicles with multiple operators, each operator may store a set of alternative configuration data in the data storage device 112 in the vehicle 102. The information system 100 provides an interface that enables each operator to select a preferred user interface configuration using input devices 132. When an operator selects one of the stored sets of user interface configuration data, the controller 104 identifies a format identifier that corresponds to the selected user interface configuration. Each format identifier corresponds to one of the stored sets of user interface configuration data. Once selected, the information system 100 generates the user interface based on the selected user interface configuration data.

In embodiments where the alternative configuration data are stored in a remote server or in a portable electronic device, the same set of alternative configuration data may be used in multiple vehicles, including different types of vehicles. In one embodiment, a vehicle occupant provides a mobile electronic device containing the alternative configuration data, and the vehicle information system 100 receives the alternative configuration data using in-vehicle I/O port 144. The vehicle information system 100 may accept user configuration data from electronic devices and remote servers when the operating condition of the vehicle 102 otherwise prevents user interface configuration changes entered via the input devices 132.

In the event that the vehicle information system 100 does not receive alternative user interface configuration data (block 516), the user interface presents web applications and other received data using the default user interface configuration data and with respect to the operating state of the vehicle as described above in FIG. 3 (block 520).

In the event that the vehicle information system 100 receives alternative user interface configuration data (block 516) the vehicle information system 100 overrides the default user interface configuration data with the alternative user interface configuration data (block 524). The alternative user interface configuration data may have alternative settings for a portion of the user interface configuration elements in the information system 100, while the default configuration data are still used for other settings. For example, an alternative set of user configuration data may include a list of contacts for voice communications, but does not override the default visual interface settings. The default configuration settings remain in use when the alternative user interface configuration data do not override the default settings.

The vehicle information system 100 presents the user interface using the alternative configuration data with respect to the operating condition of the vehicle (block 528). The information system 100 may ignore one or more alternative user interface configuration settings when the operating state of the vehicle does not permit the use of the alternative configuration. For example, an alternative user interface configuration may specify a streaming video service as a default for in-vehicle entertainment. The alternative configuration setting overrides the default settings when the vehicle is parked. When the vehicle is in motion, however, the web browser identifies the content of the video service and either prevents playback of any videos, or enables playback of audio associated with the videos during operation of the vehicle.

The process 500 shown in FIG. 5 is illustrative of one embodiment of a process for changing the configuration of a user interface in a vehicle information system. Thus, alternative embodiments may omit some of the process operations described above, and the process 500 may be carried out in an order other than the order of FIG. 5. While process 500 is described with reference to the vehicle information system 100 of FIG. 1, process 500 may be used with alternative vehicle information system embodiments.

The processes and systems described herein enable occupants of one or more vehicles to configure common user interface settings for vehicle information systems in multiple vehicles of various types. The web application system described herein enables a common set of web applications to provide infotainment services for multiple types of vehicles that would otherwise require individual software and hardware configurations for each vehicle type.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. An information system located within a vehicle comprising:
   a data storage device configured to store programmed instructions that implement a web browser;
   a data communication module;
   a plurality of vehicle sensors, each sensor being configured to generate a signal corresponding to a system within the vehicle; and
   a controller operatively coupled to the data storage device, the data communication module, and the plurality of vehicle sensors, the controller configured to:
   execute the programmed instructions stored in the data storage device to implement the web browser;
   receive through the web browser a plurality of data elements from a server external to the vehicle;
   identify a first data element in the plurality of data elements corresponding to a graphical display element in a web page with reference to semantic data associated with the plurality of data elements;
   identify a second data element in the plurality of data elements corresponding to a graphical input button element in the web page with reference to the semantic data associated with the plurality of data elements;
   identify an operating condition of the vehicle with reference to the signals generated by the plurality of sensors; and
   generate with the web browser a user interface that includes a graphical depiction of the web page in which the first data element is present, the second data element is absent, and a user interface control disabling user input to the web page in response to the identified operating condition of the vehicle indicating the vehicle is in motion.

2. The system of claim 1, the controller being further configured to:
   receive the plurality of signals from the plurality of sensors in a first format;
   convert the signals from the first format to a second format using a predetermined document structure that is compatible with a web application;
   execute the programmed instructions stored in the data storage device to implement a code execution engine with the web browser;
   download executable programmed instructions for implementing the web application from the external server;
   execute with the code execution engine of the web browser the downloaded executable programmed instructions for implementing the web application to process the signals in the second format, the first format for the sensor signal being incompatible with the web browser and the second format being compatible with the web browser.

3. The system of claim 2, the controller being further configured to:
   identify the first data element in the web page with reference to a uniform resource locator associated with the plurality of data elements.

4. The system of claim 2, the controller being further configured to:
   identify the first data element in the web page with reference to text content of the first data element in the plurality of data elements.

5. The system of claim 1, the controller being further configured to:
   generate the graphical display with reference to a set of user interface configuration data.

6. The system of claim 5, the controller being further configured to:
   receive the user interface configuration data from a mobile electronic device.

7. An information system located within a vehicle comprising:
   a data storage device configured to store programmed instructions to implement a web browser having a code execution engine;
   a plurality of vehicle sensors, each sensor being configured to generate a signal corresponding to a system within the vehicle;
   a data communication module; and
   a controller operatively coupled to the data storage device, the plurality of vehicle sensors, and the data communication module, the controller configured to:
   execute the programmed instructions stored in the data storage device to implement the web browser having the code execution engine;
   receive a plurality of signals generated by the plurality of vehicle sensors in a first format, identify the vehicle system corresponding to each of the signals, and generate vehicle sensor data in a second format, the first format not being compatible with the web browser implemented by the controller and the second format being compatible with the web browser implemented by the controller;
   receive through the data communication module executable programmed instructions for implementing a web application;
   execute with the code execution engine of the web browser the executable programmed instructions for implementing the web application;
   receive through the web browser a plurality of data elements from a server external to the vehicle;
   identify a first data element in the plurality of data elements corresponding to a graphical display element in a web page with reference to semantic data associated with the plurality of data elements;
   identify a second data element in the plurality of data elements corresponding to a graphical input button element in the web page with reference to the semantic data associated with the plurality of data elements;
   identify an operating condition of the vehicle with reference to the vehicle sensor data in the second format; and
   generate with the web browser a user interface that includes a graphical depiction of the web page in which the first data element is present, the second data element is absent, and a user interface control that disables user input to the web page in response to the identified operating condition of the vehicle indicating that the vehicle is in motion.

8. The system of claim 7, the controller being further configured to:
   receive a set of user interface configuration data; and
   generate the user interface in a format corresponding to the received set of user interface configuration data.

9. The system of claim 8, the controller being further configured to:
  receive the set of user interface configuration data from a mobile electronic device.

10. The system of claim 7, the controller being further configured to:
  identify the first data element with reference to semantic data associated with the plurality of data elements.

11. The system of claim 7, the controller being further configured to:
  identify the first data element with reference to a uniform resource locator associated with one of the data elements in the plurality of data elements.

12. The system of claim 7, the controller being configured to:
  identify that the second data element corresponds to the input button with reference to text content of at least one data element in the plurality of data elements.

13. The system of claim 1, the controller being further configured to:
  modify at least one of a position and size of a graphical depiction of the first data element to adjust a layout of the user interface.

14. The system of claim 1, the controller being further configured to:
  identify another operating condition of the vehicle with reference to another plurality of signals from the sensors; and
  generate with the web browser another user interface that includes a graphical depiction of the web page in which the first data element is present, the second data element is present, and a user interface control that enables user input to the web page in response to the identified operating condition of the vehicle indicating the vehicle is parked.

* * * * *